United States Patent Office 3,255,196
Patented June 7, 1966

3,255,196
N-PHENOXYALKYL PIPERIDINE DERIVATIVES
François Debarre, Antony, Seine, and André Cometti,
  Maisons-Alfort, Seine, France, assignors to Rhone-
  Poulenc S.A., Paris, France, a French body corporate
No Drawing. Filed Feb. 26, 1963, Ser. No. 261,228
  Claims priority, application France, Feb. 28, 1962,
    889,492; Dec. 20, 1962, 919,316
      9 Claims. (Cl. 260—294.7)

This invention relates to new, therapeutically active derivatives of piperidine, to processes for their preparation and to pharmaceutical compositions containing them.

According to the present invention, there are provided piperidine derivatives of the general formula:

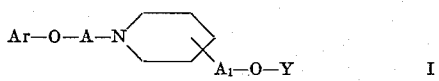
I (wherein Ar represents a phenyl group unsubstituted or substituted by one or more substituents selected from the group consisting of halogen atoms, and alkyl, alkoxy, alkenyloxy, alkylthio, alkanesulphonyl, nitro, amino, cyano and trifluoromethyl groups, A represents a straight or branched chain alkylene group containing 2 to 6 carbon atoms, $A_1$ represents a single bond or a straight or branched chain alkylene group containing 1 to 3 carbon atoms, and Y represents a hydrogen atom, or an alkanoyl, hydroxyethyl or alkanoyloxyethyl group, or a carbamoyl or carbamoyloxyethyl group which may be substituted on the nitrogen atom by one or two alkyl groups or by a group Ar as hereinbefore defined), the grouping

—$A_1$—O—Y being attached to the 3- or 4-position of the piperidine nucleus, and their acid addition and quaternary ammonium salts. In this specification and accompanying claims the alkyl, alkoxy, alkenyl, alkane and alkanoyl groups referred to contain at most 4 carbon atoms.

According to a feature of the invention, the piperidine derivatives of formula I are prepared by the process which comprises reacting a piperidine compound of the formula:

II (wherein the various symbols are as hereinbefore defined, and the grouping —$A_1$—O—Y is in the 3- or 4-position of the piperidine nucleus) with a phenoxy compound of the formula:

Ar—O—A—X    III wherein X represents the acid residue of a reactive ester such as a halogen atom or a sulphuric or sulphonic ester residue, e.g. methane-sulphonyloxy or toluene-p-sulphonyloxy, and Ar and A are as hereinbefore defined. The reaction may be effected with or without a solvent in the presence or absence of a condensing agent. Preferably the reaction is effected in an inert organic solvent such as an aromatic hydrocarbon (e.g. benzene, toluene or xylene), an alcohol (e.g. ethanol) or a tertiary amide (e.g. dimethylformamide) in the presence of a condensing agent, for example an alkali metal derivative, such as potassium or sodium carbonate. When a solvent is employed, it is advantageous to carry out the reaction at the boiling point of the solvent. An excess of the piperidine starting material of Formula II may conveniently be used as the condensing agent.

Acording to a further feature of the invention, the piperidine derivatives of Formula I are prepared by the process which comprises the reduction by methods known per se of the carbonyl group of a piperidine compound of the formula.

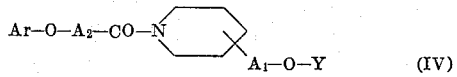
(IV)

(wherein $A_2$ represents a straight or branched chain alkylene group containing up to 5 carbon atoms, Ar, $A_1$ and Y are as hereinbefore defined, and the grouping

—$A_1$—O—Y is in the 3- or 4-position of the piperidine nucleus) to the methylene, i.e. —$CH_2$—, group. The reduction is preferably effected with lithium aluminium hydride and is then carried out under the conditions usually employed for the reduction of a carbonyl group by that reducing agent, e.g. in a cyclic ether solvent such as tetrahydrofuran.

According to a still further feature of the invention, the piperidine derivatives of Formula I, in which $A_1$ represents the group —$C(CH_3)_2$— and Y represents a hydrogen atom, are prepared by the process which comprises reacting a piperidine compound of the formula:

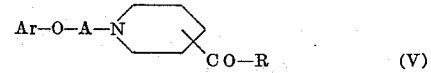
(V)

(wherein R represents a methyl or alkoxy group, Ar and A are as hereinbefore defined, and the grouping —CO—R is in the 3- or 4-position of the piperidine nucleus) with a methylmagnesium halide and hydrolysing the product obtained in manner known per se. The reaction is preferably carried out in the presence of an ether which is inert under the particular reaction conditions (e.g. diethyl ether or tetrahydrofuran) at room temperature.

It is within the scope of the present invention to convert by methods known per se a product of Formula I obtained by any of the aforementioned processes into another product of Formula I having a different Ar or —Y group. Illustrative conversion processes are as follows:

(a) Piperidine derivatives of Formula I in which Ar represents a nitrophenyl (e.g. 3- or 4- nitrophenyl) group may be converted into corresponding compounds wherein Ar represents an aminophenyl group by reduction of the nitro group to primary amino.

(b) Piperidine derivatives of Formula I in which Y represents a hydrogen atom or a hydroxyethyl group may be converted by urethanisation of the alcohol function to corresponding compounds wherein Y represents a carbamoyl or carbamoyloxyethyl group unsubstituted on the nitrogen atom or substituted thereon by one or two alkyl groups or by a group Ar as hereinbefore defined.

The urethanisation may be carried out, in particular, by reaction of the alcohol starting material with isocyanic acid, or an alkyl or phenyl isocyanate, a carbamoyl halide or an alkyl carbamate. Preferably the reaction is then carried out in the presence of an inert aromatic hydrocarbon solvent, such as benzene, toluene, or xylene, at room temperature or, more rapidly, at the boiling point of the solvent employed. When an alkyl carbamate is used as the urethanizing agent, the reaction is advantageously carried out in the presence of a catalyst such as aluminium isopropoxide.

(c) Piperidine derivatives of Formula I wherein Y represents a hydrogen atom or hydroxyethyl group may be converted by esterification of the alcohol function to corresponding compounds wherein Y represents an alkanoyl or alkanoyloxyethyl group.

The esterification may be carried out, in particular, by reaction of the alcohol starting material with a halide or anhydride of an aliphatic acid containing at most four carbon atoms. The reaction is preferably then carried out in an inert aromatic hydrocarbon solvent medium, such as benzene or toluene, in the presence or absence of a condensing agent such as pyridine.

The new piperidine derivatives of Formula I may be converted by methods known per se into acid addition and quaternary ammonium salts. The acid addition salts may be obtained by the reaction of acids on the piperidine derivatives in appropriate solvents. As organic solvents there may be used, for example, alcohols, ethers, ketones or chlorinated hydrocarbons; water may advantageously be used as an inorganic solvent. The acid addition salt which is formed is precipitated, if necessary after concentration of its solution, and is separated by filtration or decantation. The quaternary ammonium salts may be obtained by the action of esters on the piperidine derivatives, optionally in an organic solvent, at room temperature or, more rapidly, with gentle heating.

In this specification and accompanying claims, the term "methods known per se" means methods heretofore used or described in the chemical literature.

The new piperidine derivatives of the present invention and their non-toxic acid addition and quaternary ammonium salts possess pharmacological properties; in particular, they are very active antitussives and, moreover, possess analgesic, antiemetic and local anaesthetic properties. Preferred compounds are those in which Ar represents a phenyl group or a phenyl group substituted by a halogen atom or an alkyl, alkoxy, alkanesulphonyl, nitro or cyano group, A represents a straight or branched alkylene chain containing 2, 3 or 4 carbon atoms, and Y represents a hydrogen atom or a hydroxyethyl group; in particular, 1-(2-phenoxyethyl)-4-hydroxypiperidine, 1-(2,4' - chlorophenoxyethyl)-4-hydroxypiperidine, 1-(2-phenoxyethyl) - 4 - (2-hydroxyethyl)piperidine, 1-(2-phenoxy ethyl) - 4 - (2,2'-hydroxyethoxyethyl)piperidine, 1 - (3,4'-chlorophenoxypropyl) - 4 - (2-hydroxyethyl) piperidine, 1 - (3,4'-chlorophenoxypropyl)-4- (1-hydroxyethyl)piperidine, 1 - (3,4' - chlorophenoxypropyl)-4-hydroxypiperidine, and 1 - (2-phenoxyethyl)-4-(1-hydroxy-1-methyl-1-ethyl)piperidine, and their acid addition and quaternary ammonium salts.

For therapeutic purposes, the bases of general Formula I may be employed as such or in the form of non-toxic acid addition salts, i.e. salts containing anions which are relatively innocuous to the animal organism in therapeutic doses of the salts (such as hydrochlorides and other hydrohalides, phosphates, nitrates, sulphates, acetates, propionates, succinates, benzoates, fumarates, maleates, citrates, tartrates, theophyllinacetates, salicylates, phenolphthalinates, methanesulphonates, ethanedisulphonates, and methylene-bis-β-hydroxynaphthoates) so that the beneficial physiological properties inherent in the bases are not vitiated by side-effects ascribable to the anions. However, they may also be employed in the form of non-toxic quaternary ammonium salts obtained by reaction with organic halides (e.g. methyl, ethyl, allyl or benzyl iodide, chloride or bromide) or other reactive esters, e.g. methyl or ethyl sulphate, benzenesulphonate or toluene-p-sulphonate.

The following examples illustrate the invention.

*Example I*

A mixture of 1-bromo-2-phenoxyethane (100.5 g.), 4-hydroxypiperidine (50.5 g.), potassium carbonate (69 g.) and toluene (500 cc.) is heated under reflux for 6 hours. After cooling, water (375 cc.) is added, the toluene layer is separated by decantation and then extracted with N hydrochloric acid (750 cc. total). The acid phase is made alkaline by the addition of sodium hydroxide solution (d.=1.33; 100 cc.) and the free organic base extracted with diethyl ether (500 cc. total). The ethereal solution is dried over sodium sulphate and concentrated on a water bath to a small volume. A product crystallises which is filtered off and washed with diethyl ether (50 cc. total), giving 1-(2-phenoxyethyl)-4-hydroxypiperidine (56.4 g.) M.P. 91° C.

The 1-bromo-2-phenoxyethane used as starting material is prepared according to C. S. Marvel and A. L. Tanenbaum, Organic Syntheses, 2nd edition, John Wiley & Sons, Inc., New York, 1946, coll. vol. I, p. 436. The 4-hydroxypiperidine is prepared according to B. Emmert and W. Dorn, Ber., 48, 687 (1915).

*Example II*

Proceeding as in Example I but commencing with 1-bromo-2-phenoxyethane (50 g.) and 3-hydroxypiperidine (25 g.), 1-(2-phenoxyethyl)-3-hydroxypiperidine (50.9 g.), M.P. 70° C., is obtained after recrystallisation from cyclohexane.

The 3-hydroxypiperidine used as starting material is prepared according to J. H. Biel et coll., J. Amer. Chem. Soc., 74, 1485 (1952).

*Example III*

Proceeding as in Example I but commencing with 1-bromo-2-phenoxyethane (28.1 g.) and 4-hydroxymethylpiperidine (16.1 g.), 1-(2-phenoxyethyl)-4-hydroxymethylpiperidine (13.7 g.), M.P. 45–46° C., is obtained after distillation in vacuo (B.P. 160–180° C./0.5 mm. Hg) and two successive recrystallisations from petroleum ether followed by a recrystallisation from heptane.

The 4-hydroxymethylpiperidine used as starting material is prepared according to G. R. Clemo and T. P. Metcalfe, J. Chem. Soc., p. 1523 (1937).

*Example IV*

Proceeding as in Example I but commencing with 1-bromo-3-phenoxypropane (43.0 g.) and 4-hydroxypiperidine (20.2 g.), 1 - (3 - phenoxypropyl) - 4 - hydroxypiperidine (37.8 g.), M.P. 74° C., is obtained after recrystallisation from cyclohexane.

The 1-bromo-3-phenoxypropane used as starting material is prepared according to C. S. Marvel and A. L. Tanenbaum, Organic Syntheses, 2nd edition, John Wiley & Sons, Inc., New York, 1946, coll. vol. I, p. 435. The brominated derivatives of aryloxyalkanes used as starting materials in the following examples are prepared by an analogous method.

*Example V*

Proceeding as in Example I but commencing with 1-bromo-2-(3-methylphenoxy)ethane (21.5 g.) and 4-hydroxypiperidine (10.1 g.), 1-(2-3'-methylphenoxyethyl)-4-hydroxypiperidine (15.6 g.), M.P. 73–74° C., is obtained after distillation in vacuo (B.P. 175–180° C./0.5 mm: Hg) and recrystallisation from cyclohexane.

*Example VI*

Proceeding as in Example I but commencing with 1-bromo-2-(4-chlorophenoxy)ethane (32.0 g.) and 4-hydroxypiperidine (13.1 g.), 1-(2-4'-chlorophenoxyethyl)-4-hydroxypiperidine (25.7 g.), M.P. 111° C., is obtained after recrystallisation from cyclohexane.

*Example VII*

Proceeding as in Example I but commencing with 1-bromo-2-phenoxyethane (21.1 g.) and 4-(2-hydroxyethyl)piperidine (18.1 g.), 1-(2-phenoxyethyl)-4-(2-hydroxyethyl)piperidine (19 g.) is obtained in the form of an oil, B.P. 125° C./0.5 mm. Hg, after distillation in vacuo. The fumarate, prepared in ethanol and recrystallised from an ethyl acetate-isopropanol (1:1) mixture, is a white crystalline powder, M.P. 100° C.

The 4-(2-hydroxyethyl)piperidine used as starting material is prepared according to R. L. Malan and P. M. Dean, J. Amer. Chem. Soc., 69, 1797 (1947).

*Example VIII*

Proceeding as in Example I but commencing with 1-bromo-2-(4-methylphenoxy)ethane (21.5 g.) and 4-hydroxypiperidine (10.1 g.), 1-(2-4'-methylphenoxyethyl)-

4-hydroxypiperidine (13.8 g.) is obtained in the form of an oil, B.P. 155–165° C./0.2 mm. Hg, after distillation in vacuo. The meleate, prepared in ethyl acetate and recrystallised from isopropanol, is a white crystalline powder, M.P. 88° C.

*Example IX*

Proceeding as in Example I but commencing with 1-bromo-2-phenoxyethane (20.1 g.) and 3-hydroxymethylpiperidine (11.5 g.), 1-(2-phenoxyethyl)-3-hydroxymethylpiperidine (18.8 g.) is obtained in the form of an oil, B.P. 185° C./0.05 mm. Hg, after distillation in vacuo. The fumarate, prepared in isopropanol, is a white crystalline powder, M.P. 94° C.

The 3-hydroxymethylpiperidine used as starting material is prepared according to L. T. Sandborn and C. S. Marvel, J. Amer. Chem. Soc., 50, 565 (1928).

*Example X*

Proceeding as in Example I but commencing with 1-bromo-2-phenoxyethane (22.1 g.) and 3-(2-hydroxyethyl)piperidine (12.85 g.), 1-(2-phenoxyethyl)-3-(2-hydroxyethyl)piperidine (12.4 g.) is obtained in the form of an oil, B.P. 140–185° C./0.2 mm. Hg, after distillation in vacuo. The hydrochloride, prepared in ether and recrystallised from ethanol, is a white crystalline powder, M.P. 130° C.

The 3-(2-hydroxyethyl)piperidine used as starting material is prepared according to R. Paul and S. Tchelitcheff, Bull. Soc. Chim., p. 1139 (1954).

*Example XI*

A mixture of 1-bromo-2-(4-methoxyphenoxy)ethane (35.0 g.), 4-hydroxypiperidine (15.2 g.), potassium carbonate (24.0 g.) and toluene (150 cc.) is heated under reflux for 7 hours, cooled and water (100 cc.) added. The toluene layer is separated by decantation and then extracted with N hydrochloric acid (200 cc. total). The aqueous acid phase is made alkaline by the addition of sodium hydroxide solution (d.=1.33; 25 cc.) and the free base extracted with ethyl acetate (200 cc. total). The organic solution is dried over sodium sulphate, filtered, the solvent removed under reduced pressure (25 mm. Hg) and the residual oil distilled in vacuo (0.5 mm. Hg), giving 1-(2,4′-methoxyphenoxyethyl)-4-hydroxypiperidine (21.9 g.) in the form of a viscous oil, B.P. 180–192° C./0.5 mm. Hg. The neutral fumarate, prepared in ethanol, is a white crystalline powder, M.P. 141–142° C.

The 1-bromo-2-(4-methoxyphenoxy)ethane used as starting material is prepared according to C. S. Marvel and A. L. Tanenbaum, Organic Syntheses, 9, 72 (1929). The halogenated derivatives of aryloxyalkanes used as starting materials in the following examples are prepared by an analogous method.

*Example XII*

Proceeding as in Example XI but commencing with 1-bromo-2-(2-chlorophenoxy)ethane (47.1 g.) and 4-hydroxypiperidine (20.2 g.), 1-(2-2′-chlorophenoxyethyl)-4-hydroxypiperidine (16.1 g.), M.P. 75° C., is obtained after recrystallisation from ethyl acetate.

*Example XIII*

Prooceeding as in Example XI but commencing with 1-bromo-2-phenoxyethane (12.1 g.) and 4-(2,2′-hydroxyethoxyethyl)piperidine (10.4 g.), 1-(2-phenoxyethyl)-4-(2,2′-hydroxyethoxyethyl)piperidine (11.7 g.), M.P. 57–58° C., is obtained after recrystallisation from diisopropyl ether.

The 4-(2,2′-hydroxyethoxyethyl)piperidine used as starting material is prepared by catalytic hydrogenation of 4-(2,2′-hydroxyethoxyethyl)pyridine, itself obtained by the condensation of 4-vinylpyridine with ethylene glycol.

*Example XIV*

Proceeding as in Example XI but commencing with 1-bromo-2-(2-methoxyphenoxy)ethane (35.0 g.) and 4-hydroxypiperidine (15.2 g.), 1-(2,2′-methoxyphenoxyethyl)-4-hydroxypiperidine (23.9 g.) is obtained, after distillation in vacuo, in the form of an oil, B.P. 120–170° C./0.2 mm. Hg. The hydrochloride, prepared in ethanol and recrystallised from an isopropanol-ethyl acetate (1:1) mixture, is a white crystalline powder, M.P. 125° C.

*Example XV*

Proceeding as in Example XI but commencing with 1-bromo-2-phenoxyethane (15.2 g.) and 3-(3-hydroxypropyl)piperidine (11.0 g.), 1-(2-phenoxyethyl-3-(3-hydroxypropyl)piperidine (13.3 g.) is obtained, after distillation in vacuo, in the form of an oil, B.P. 197° C./0.07 mm. Hg. The hydrochloride prepared in, and recrystallised from, isopropanol is a white crystalline powder, M.P. 156° C.

The 3-(3-hydroxypropyl)piperidine used as starting material is prepared according to V. Prelog et coll., Ber., 72, 1319 (1939).

*Example XVI*

Proceeding as in Example XI but commencing with 1-bromo-2-phenoxyethane (20.1 g.) and 4-(3-hydroxypropyl)piperidine (14.3 g.), 1-(2-phenoxyethyl)-4-(3-hydroxypropyl)piperidine (17.2 g.), M.P. 50° C., is obtained after recrystallisation from diisopropyl ether.

The 4-(3-hydroxypropyl)piperidine used as starting material is prepared according to R. R. Burtner and J. M. Brown, J. Amer. Chem. Soc., 69, 630 (1947).

*Example XVII*

Proceeding as in Example XI but commencing with 1-bromo-2-(4-nitrophenoxy)ethane (24.6 g.) and 4-hydroxypiperidine (10.1 g.), 1-(2-4′-nitrophenoxyethyl)-4-hydroxypiperidine (15.0 g.), M.P. 120–121° C., is obtained after recrystallisation from chloroform.

*Example XVIII*

Proceeding as in Example XI but commencing with 1-bromo-3-(4-chlorophenoxy)propane (25.0 g.) and 4-(2-hydroxyethyl)piperidine (13.0 g.), 1-(3,4-chlorophenoxypropyl)-4-(2-hydroxethyl)piperidine (17.6 g.), M.P. 53° C., is obtained after recrystallisation from cyclohexane.

*Example XIX*

Proceeding as in Example XI but commencing with 1-bromo-4-phenoxybutane (45.7 g.) and 4-hydroxypiperidine (20.2 g.), 1-(4-phenoxybutyl)-4-hydroxypiperidine (25.9 g.), M.P. 86–87° C., is obtained after recrystallisation from cyclohexane.

*Example XX*

Uroceeding as in Example XI but commencing with 1-bromo-2-(4-cyanophenoxy)ethane (22.6 g.) and 4-hydroxypiperidine (10.1 g.), 1-(2-4′-cyanophenoxyethyl)-4-hydroxypiperidine (11.0 g.), M.P. 115° C., is obtained after recrystallisation from ethyl acetate.

*Example XXI*

Proceeding as in Example XI but commencing with 1-bromo-2-(3-chlorophenoxy)ethane (23.5 g.) and 4-hydroxypiperidine (10.1 g.), 1-(2,3′-chlorophenoxyethyl)-4-hydroxypiperidine (15.3 g.), M.P. 75–76° C., is obtained after recrystallisation from cyclohexane.

*Example XXII*

Proceeding as in Example XI but commencing with 1-bromo-3-(4-chlorophenoxy)propane (20.4 g.) and 4-(1-hydroxyethyl)piperidine (10.7 g.), 1-(3,4′-chlorophenoxypropyl)-4-(1-hydroxyethyl)piperidine (14.0 g.), M.P. 58° C., is obtained after recrystallisation from cyclohexane.

The 4-(1-hydroxyethyl)piperidine used as starting material is prepared by the catalytic reduction of 4-acetylpyridine.

*Example XXIII*

Proceeding as in Example XI but commencing with 1-bromo-2-(2,4-dichlorophenoxy)ethane (32.0 g.) and 4-hydroxypiperidine (12.1 g.), 1-(2,2',4'-dichlorophenoxyethyl)-4-hydroxypiperidine (31.0 g.) is obtained in the form of an oil. The fumarate, prepared in and recrystallised from ethanol, is a white crystalline powder, M.P. 155–156° C.

*Example XXIV*

Proceeding as in Example XI but commencing with 1-bromo-3-(4-chlorophenoxy)propane (74.8 g.) and 4-hydroxypiperidine (30.2 g.), 1-(3-4'-chlorophenoxypropyl)-4-hydroxypiperidine (34.3 g.), M.P. 76° C., is obtained after recrystallisation from diisopropyl ether.

*Example XXV*

Proceeding as in Example XI but commencing with 1-bromo-3-(2-methyl-4-chlorophenoxy)propane (26.3 g.) and 4-(2-hydroxyethyl)piperidine (13.0 g.), 1-(3-2'-methyl-4'-chlorophenoxypropyl)-4-(2-hydroxyethyl)piperidine (20.4 g.) is obtained, after distillation in vacuo, in the form of an oil, B.P. 185–195° C./0.2 mm. Hg. The fumarate, prepared in and recrystallised from ethanol, is a white crystalline powder, M.P. 127° C.

*Example XXVI*

Proceeding as in Example XI but commencing with 1-bromo-2-phenoxyethane (18.5 g.) and 4-(1-methyl-2-hydroxyethyl)piperidine (13.0 g.), 1-(2-phenoxyethyl)-4-(1-methyl-2-hydroxyethyl)piperidine (17.9 g.) is obtained, after distillation in vacuo, in the form of an oil, B.P. 178–179° C./0.2 mm. Hg. The maleate, prepared in methyl ethyl ketone and recrystallised from ethyl acetate, is a white crystalline powder, M.P. 98° C.

The 4-(1-methyl-2-hydroxyethyl)piperidine used as starting material is prepared by the catalytic hydrogenation of 4-(1-methyl-2-hydroxyethyl)pyridine, obtained according to M. V. Rubtson et coll., Zhur, Obshchei Khim., 25, 2453 (1955), C.A. 50, 9401c (1956).

*Example XXVII*

A solution of 1-(2-phenoxyethyl)-4-hydroxypiperidine (22.0 g.) and benzyl bromide (35.9 g.) in acetone (100 cc.) is heated under reflux for 5 hours, cooled and the precipitate formed filtered off and washed with acetone (75 cc. total). The crude product thus obtained is recrystallised from ethanol (600 cc.), giving 1-benzyl-1-(2-phenoxyethyl)-4-hydroxypiperidinium bromide (15.3 g.), M.P. 198° C.

*Example XXVIII*

A solution of 1-chloro-2-methyl-3-phenoxypropane (18.5 g.) and 4-hydroxypiperidine (20.4 g.) in xylene (200 cc.) is heated under reflux for 24 hours, cooled, and water (100 cc.) added. The xylene layer is separated by decantation and then extracted with N hydrochloric acid (125 cc. total). The aqueous phase is made alkaline by the addition of sodium hydroxide solution (d.=1.33; 15 cc.) and the free base extracted with diethyl ether (100 cc. total). The ethereal solution is dried over sodium sulphate, filtered, the ether removed on a water bath and the residual oil distilled in vacuo (0.2 mm. Hg), giving 1-(3-phenoxy-2-methyl-1-propyl)-4-hydroxypiperidine (16.0 g.) in the form of an oil, B.P. 142–150° C./0.2 mm. Hg. The fumarate, prepared in ethanol, is a white crystalline powder, M.P. 138–139° C.

*Example XXIX*

A mixture of 1-phenoxy-2-chloropropane (57.7 g.) and 4-hydroxypiperidine (67.0 g.) is heated at 170–180° C. for 2 hours and the hot reaction mass is then poured into a mixture of water (500 cc.) and diethyl ether (600 cc.). The ethereal layer is separated by decantation and then extracted with N hydrochloric acid (710 cc. total). The aqueous acid phase is made alkaline by the addition of sodium hydroxide solution (d.=1.33; 110 cc.) and the free base extracted with ether. The ethereal solution is dried over sodium sulphate, filtered, the ether removed on a water bath and the residual oil distilled in vacuo (0.4 mm. Hg). The distillate is recrystallised from cyclohexane, giving 1-(2-phenoxy-1-methylethyl)-4-hydroxypiperidine (25.8), M.P. 53–54° C.

*Example XXX*

A mixture of 1-bromo-2-(4-methanesulphonylphenoxy)ethane (23.0 g.) and 4-hydroxypiperidine (16.7 g.) is heated for 5 hours at 130–140° C., cooled, and water (80 cc.) added. After warming to 60° C. to obtain complete solution, sodium chloride (45 g.) is added and extraction carried out with ethyl acetate (360 cc. total). The organic solution is dried over sodium sulphate, filtered, the ethyl acetate removed under reduced pressure (25 mm. Hg) and the residual oil then dried in vacuo (0.5 mm. Hg) giving 1-(2,4'-methanesulphonylphenoxyethyl)-4-hydroxypiperidine (23.5 g.). The maleate, prepared in ethyl acetate and recrystallised from ethanol, is a white crystalline powder M.P. 161–162° C.

*Example XXXI*

A solution of 1-(2-phenoxypropionyl)-4-hydroxypiperidine (25.0 g.) in anhydrous tetrahydrofuran (750 cc.) is added, over 40 minutes with stirring, to a suspension of lithium aluminium hydride (10 g.) in anhydrous tetrahydrofuran (100 cc.). The addition completed, the mixture is heated under reflux for 30 minutes and then allowed to stand overnight. Ethyl acetate (50 cc.) is then added with stirring, followed by a saturated aqueous solution (125 cc.) of Seignette's salt (a double tartrate of potassium and sodium). After filtration, the insoluble material is washed with diethyl ether (300 cc. total) and the filtrate evaporated to dryness under reduced pressure (25 mm. Hg). The residual oil is dissolved in ether (250 cc.) and the solution obtained extracted with N hydrochloric acid (350 cc. total). The aqueous acid phase is made alkaline by the addition of sodium hydroxide solution (d.=1.33; 40 cc.) and the free base extracted with diethyl ether (500 cc. total). The ethereal solution is dried over sodium sulphate, filtered, the ether removed on a water bath and the residual oil distilled in vacuo (0.5 mm. Hg), giving 1-(2-phenoxypropyl)-4-hydroxypiperidine (18.0 g.), B.P. 123–128° C./0.5 mm. Hg. The hydrochloride, prepared in an ethyl acetate-ethanol (2:1) mixture, is a white crystalline powder, M.P. 158–159° C.

The 1-(2-phenoxypropionyl)-4-hydroxypiperidine used as starting material is prepared by the condensation of 2-phenoxypropionyl chloride with 4-hydroxypiperidine.

*Example XXXII*

A solution of 1-(2-phenoxyethyl)-4-ethoxycarbonylpiperidine (20.7 g.) in diethyl ether (90 cc.) is added to an etheral solution of methylmagnesium iodide [prepared from magnesium (4.0 g.), methyl iodide (23.4 g.) and diethyl ether (240 cc.)]. After stirring for 18 hours at 25° C. 2 N hydrochloric acid (250 cc.) is added, and insoluble material filtered off. The aqueous layer is separated by decantation, made alkaline by the addition of sodium hydroxide solution (d.=1.33; 70 cc.) and the free base extracted with diethyl ether (300 cc. total). The ethereal solution is dried over sodium sulphate, filtered and the diethyl ether removed on a water bath giving, after recrystallization from diisopropyl ether, 1-(2-phenoxyethyl)-4-(1-hydroxy-1-methyl-1-ethyl) piperidine (10.0 g.), M.P. 72° C.

The 1-(2-phenoxyethyl)-4-ethoxycarbonylpiperidine used as starting material is prepared by condensing 1-bromo-2-phenoxyethane with 4-ethoxycarbonylpiperidine.

Example XXXIII

Pyridine (12 cc.) is added to a solution of 1-(2-phenoxyethyl)-4-hydroxypiperidine (33.1 g.) in anhydrous toluene (280 cc.) followed, slowly, by propionyl chloride (15.0 g.) and the reaction mixture is heated under reflux for 4 hours. After cooling, a solution of sodium bicarbonate (12.5 g.) in water (200 cc.) is added and the toluene layer decanted, washed with water and dried over sodium sulphate. After filtering, the toluene is removed under reduced pressure (25 mm. Hg) and the residual oil distilled in vacuo (0.1 mm. Hg), giving 1-(2-phenoxyethyl)-4-propionyloxypiperidine (32.2 g.) in the form of an oil, B.P. 170–183° C./0.1 mm. Hg. The fumarate, prepared in ethanol and recrystallised from ethyl acetate, is a white crystalline powder, M.P. 104° C.

Example XXXIV

A solution of 1-(2-phenoxyethyl)-4-hydroxypiperidine (15.5 g.) and phenyl isocyanate (9.9 g.) in toluene (100 cc.) is heated under reflux for 2 hours, cooled, and a quantity (about 50 cc.) of toluene removed by distillation under reduced pressure (25 mm. Hg). The precipitate is then filtered off and washed with toluene (15 cc.), followed by ethanol (10 cc.). The crude product thus obtained is then redissolved in benzene (500 cc.) at 25° C. and a small quantity of insoluble material filtered off. The filtrate is dried by distillation under reduced pressure (25 mm. Hg). The dry residue is recrystallised from ethanol (30 cc.), giving 1-(2-phenoxyethyl)-4-phenylcarbamoyloxypiperdine (13 g.), M.P. 125–126° C.

Example XXXV

Proceeding as in Example XXXIV but commencing with 1-(2-phenoxyethyl)-4-hydroxypiperidine (22.1 g.) and 4-chlorophenyl isocyanate (18.5 g.) 1-(2-phenoxyethyl)-4-(4-chlorophenylcarbamoyloxy)-piperidine (34.0 g.), M.P. 146° C., is obtained after recrystallisation from benzene.

Example XXXVI

Proceeding as in Example XXXIV but commencing with 1 - (2,4' - chlorophenoxyethyl)-4-hydroxypiperidine (25.6 g.) and phenyl isocyanate (131. g), 1-(2,4'-chlorophenoxyethyl)-4-phenylcarbamoyloxypiperidine (27.1 g.), M.P. 136° C., is obtained after recrystallisation from ethanol.

Example XXXVII

Proceeding as in Example XXXIV but commencing with 1 - (2,4' - chlorophenoxyethyl)-4-hydroxypiperidine (25.6 g.) and 4-chlorophenyl isocyanate (18.5 g.), 1-(2,4'-chlorophenoxyethyl)-4-(4 - chlorophenylcarbomoyloxy)-piperidine (30.2 g.), M.P. 152° C., is obtained after recrystallisation from ethanol.

Example XXXVIII

A solution of 1-(2-phenoxyethyl)-4-hydroxypiperidine (22.1 g.) and ethyl carbamate (8.9 g.) in anhydrous toluene (110 cc.), to which has been added aluminium isopropoxide (2.0 g.), is heated under reflux for 12 hours, the ethanol formed during the reaction being distilled off continuously. After cooling, the precipitate is filtered off and washed with toluene (20 cc. total). The crude product is recrystallised from ethanol (1000 ccc.), giving 1-(2-phenoxyethyl)-4-carbamoyloxypiperidine (16.7 g.), M.P. 180° C.

The present invention further includes within its scope pharmaceutical compositions which comprise, as active ingredient, at least one piperidine derivative of general Formula I, or non-toxic acid addition or quaternary ammonium salt thereof, in association with a pharmaceutical carrier or coating. In clinical practice the compounds of the present invention will normally be administered orally, rectally or parenterally.

Solid compositions for oral administration include compressed tablets, pills, dispersible powders, and granules. In such solid compositions one or more of the active compounds is, or are, admixed with at least one inert diluent such as calcium carbonate, potato starch, alginic acid, or lactose. The compositions may also comprise, as is normal practice, additional substances other than inert diluents, e.g. lubricating agents, such as magnesium stearate. Liquid compositions for oral administration include pharmaceutically acceptable emulsions, solutions, syrups and elixirs containing inert diluents commonly used in the art, such as water and liquid paraffin. Besides inert diluents such compositions may also comprise adjuvants, such as wetting and suspending agents, and sweetening, flavouring and preserving agents. The compositions according to the invention, for oral administration, also include capsules of absorbable material such as gelatin containing one or more of the active substances with or without the addition of diluents or excipients.

Solid compositions for rectal administration include suppositories formulated in manner known per se and containing one or more of the active compounds.

Preparations according to the invention, for parenteral administration, include sterile aqueous or non-aqueous solutions, suspensions, or emulsions. Examples of non-aqueous solvents or suspending media are propylene glycol, polyethylene glycol, vegetable oils such as olive oil, and injectable organic esters such as ethyl oleate. These compositions may also contain adjuvants such as preserving, wetting, emulsifying and dispersing agents. They may be sterilised by, for example, filtration through a bacteria-retaining filter, by incorporation in the compositions of sterilising agents, by irradiation, or by heating. They may also be manufactured in the form of sterile solid compositons, which can be dissolved in sterile water or some other sterile injectable medium immediately before use.

The percentage of active ingredient in the compositions of the invention may be varied, it being necessary that it should constitute a proportion such that a suitable dosage for the therapeutic effect desired shall be obtained.

The following examples illustrate pharmaceutical compositions according to the invention.

Example XXXIX

A syrup is prepared having the composition:

| | | |
|---|---|---|
| 1-(2-phenoxyethyl)-4-hydroxypiperidine | g | 0.200 |
| 0.1 N hydrochloric acid | cc | 9 |
| Ethyl alcohol, 95° Abs. | cc | 1 |
| Sugar | g | 83.00 |
| Raspberry flavour | cc | 0.2 |
| Distilled water, q.s. | cc | 100 |

Example XL

Tablets, each containing 30 mg. of active substance and having the following composition, are prepared in conventional manner:

| | G. |
|---|---|
| 1-(2-phenoxyethyl)-4-hydroxypiperidine | 0.030 |
| Starch | 0.137 |
| Silica gel | 0.130 |
| Magnesium stearate | 0.003 |

We claim:

1. A compound selected from the group consisting of compounds of the formula:

wherein Ar is a member of the class consisting of phenyl and phenyl substituted by a member of the class consisting of halogen, alkyl of up to 4 carbon atoms, alkoxy of up to 4 carbon atoms, alkanesulphonyl of up to 4 carbon atoms, nitro, and cyano, A is alkylene of 2 to 4 carbon atoms, $A_1$ is a member of the class consisting of a single bond and alkylene of 1 to 3 carbon atoms, and Y is a member of the class consisting of hydrogen and hydroxyethyl, and their non-toxic acid addition and non-toxic quaternary ammonium salts.

2. 1-(2-phenoxyethyl)-4-hydroxypiperidine.
3. 1-(2,4'-chlorophenoxyethyl)-4-hydroxypiperidine.
4. 1-(2-phenoxyethyl)-4-(2-hydroxyethyl)piperidine.
5. 1 - (2 - phenoxyethyl) - 4 - (2 - 2' - hydroxyethoxyethyl)piperidine.
6. 1 - (3,4' - chlorophenoxypropyl) - 4 (2 - hydroxyethyl)piperidine.
7. 1 - (3,4' - chlorophenoxypropyl) - 4 - (1 - hydroxyethyl)piperidine.
8. 1-(3,4'-chlorophenoxypropyl)-4-hydroxypiperidine.
9. 1 - (2 - phenoxyethyl) - 4 - (1 - hydroxy - 1 - methyl-1-ethyl)piperidine.

References Cited by the Examiner

UNITED STATES PATENTS 3,122,556   2/1964   Janssen _____ 260—294.7

OTHER REFERENCES

Biel et al.: Jour. Org. Chem., vol. 26, pages 4096–4103 (1961).

WALTER A. MODANCE, *Primary Examiner.*

NICHOLAS S. RIZZO, *Examiner.*

ROBERT L. PRICE, AVROM D. SPEVACK,
*Assistant Examiners.*